(12) United States Patent
Wintermantel et al.

(10) Patent No.: US 8,203,481 B2
(45) Date of Patent: Jun. 19, 2012

(54) RADAR SYSTEM FOR DETECTING THE SURROUNDINGS WITH COMPENSATION OF INTERFERING SIGNALS

(75) Inventors: Markus Wintermantel, Lindau (DE); Hansjerg Goelz, Gilching (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 129 days.

(21) Appl. No.: 12/310,933

(22) PCT Filed: Oct. 5, 2007

(86) PCT No.: PCT/DE2007/001783
§ 371 (c)(1),
(2), (4) Date: Mar. 11, 2009

(87) PCT Pub. No.: WO2008/040341
PCT Pub. Date: Apr. 10, 2008

(65) Prior Publication Data
US 2010/0085233 A1    Apr. 8, 2010

(30) Foreign Application Priority Data
Oct. 6, 2006  (DE) .......................... 10 2006 047 759

(51) Int. Cl.
*G01S 7/36* (2006.01)
*G01S 13/34* (2006.01)
*G01S 13/91* (2006.01)
(52) U.S. Cl. ........................... 342/112; 342/70; 342/109
(58) Field of Classification Search .............. 342/70–72, 342/112
See application file for complete search history.

(56) References Cited

U.S. PATENT DOCUMENTS

| | | | |
|---|---|---|---|
| 4,622,552 A * | 11/1986 | Andrews et al. | 342/196 |
| 5,633,642 A | 5/1997 | Hoss et al. | |
| 5,774,091 A * | 6/1998 | McEwan | 342/387 |
| 5,805,110 A * | 9/1998 | McEwan | 342/387 |
| 5,923,280 A * | 7/1999 | Farmer | 342/70 |
| 5,963,163 A * | 10/1999 | Kemkemian et al. | 342/109 |
| 5,986,602 A * | 11/1999 | Frink | 342/126 |
| 6,028,548 A * | 2/2000 | Farmer | 342/70 |
| 6,122,602 A * | 9/2000 | Michalski et al. | 702/159 |

(Continued)

FOREIGN PATENT DOCUMENTS

DE    199 35 265    2/2001

(Continued)

OTHER PUBLICATIONS

International Preliminary Report on Patentability for Application No. PCT/DE2007/001783, 8 pages, International Bureau of WIPO, Geneva, Switzerland. dated Jun. 25, 2009.

(Continued)

*Primary Examiner* — Thomas Tarcza
*Assistant Examiner* — Matthew M Barker
(74) *Attorney, Agent, or Firm* — W. F. Fasse (57) ABSTRACT

In a frequency-modulated radar system and method for detecting the surroundings, a compensation of interfering effects is achieved by varying one of the following values:
a) a time spacing or temporal distance between the transmitted frequency ramps or the time gap between the frequency ramps,
b) a time from the start of the respective transmitted frequency ramp to the beginning of the scanning of the received signal,
c) a frequency at the start of the transmitted frequency ramp, and
d) a sign of the slope of the transmitted frequency ramps.

27 Claims, 4 Drawing Sheets

U.S. PATENT DOCUMENTS

| | | | |
|---|---|---|---|
| 6,577,269 B2 * | 6/2003 | Woodington et al. | 342/196 |
| 6,587,074 B1 | 7/2003 | Winter et al. | |
| 6,683,557 B2 * | 1/2004 | Pleva et al. | 342/74 |
| 6,707,419 B2 * | 3/2004 | Woodington et al. | 342/200 |
| 6,816,107 B2 * | 11/2004 | Pleva et al. | 342/74 |
| 6,864,831 B2 * | 3/2005 | Woodington et al. | 342/70 |
| 6,977,609 B2 * | 12/2005 | Pleva et al. | 342/28 |
| 7,071,868 B2 * | 7/2006 | Woodington et al. | 342/70 |
| 7,336,218 B2 * | 2/2008 | Nishimura et al. | 342/70 |
| 7,391,361 B2 * | 6/2008 | Kishida | 342/109 |
| 7,420,502 B2 * | 9/2008 | Hartzstein et al. | 342/70 |
| 7,443,336 B2 * | 10/2008 | Noda | 342/135 |
| 7,466,260 B2 * | 12/2008 | Ishii et al. | 342/70 |
| 7,492,310 B2 * | 2/2009 | Haberland et al. | 342/70 |
| 2002/0075178 A1 | 6/2002 | Woodington et al. | |
| 2006/0181448 A1 * | 8/2006 | Natsume et al. | 342/70 |

FOREIGN PATENT DOCUMENTS

WO     WO 95/14939     6/1995

OTHER PUBLICATIONS

Andrzej Wojtkiewicz et al., "Two-dimensional signal processing in FMCW radars", XXth National Conference "Circuit Theory and Electronic Networks", Kolobrzeg, Poland, Oct. 21-24, 1997, pp. 475 to 480.

* cited by examiner

RADAR SYSTEM FOR DETECTING THE SURROUNDINGS WITH COMPENSATION OF INTERFERING SIGNALS

FIELD OF THE INVENTION

The invention relates to a radar system for detecting the surroundings with means for compensating interfering signals. A system of this type for monitoring the environment can be used e.g. in a motor vehicle, in which a driver assistance or safety function is provided.

BACKGROUND INFORMATION

Radar systems for detecting the surroundings of a motor vehicle are known. With the detection of the surroundings a dynamic situation picture or image of the traffic space or surroundings results, which shows the distance and the relative speed of the surrounding objects. The situation picture can present the initial information of a driver assistance system, which takes over e.g. the longitudinal regulation of the vehicle or which serves for recognizing danger situations. Interfering factors such as internal or external interfering irradiations, the radiation of radar systems of other vehicles, and trappings or over-range faults of the radar sensor system distort the measurement data of surrounding objects and may lead to a misdetection of objects in such cases. Thus, the function of a driver assistance system is subject to disturbance to a significant extent.

SUMMARY OF THE INVENTION

It is the object of the present invention to provide a radar system and a method that compensates interfering signals.

The radar system and the method according to embodiments of the present invention includes several independently combinable possibilities for compensating interfering signals. For example, internal interfering frequencies, external interfering irradiations, and trappings or over-range faults are included among the compensated interfering signals. For the compensation, the starting times of the transmitting and/or receiving intervals are varied in time relative to a regular interval.

The radar system and/or the method for detecting the surroundings according to embodiments of the invention is equipped with transmitting means for the directed emission of transmission power, receiving means for the directed receipt of received power arising as a portion of the transmission power that is reflected from surrounding objects, and signal processing means for processing the received power. The frequency of the radiated transmission power is modulated such that the transmission power includes a sequence of linear frequency ramps that each have the same slope at least with regard to the value or magnitude. Between the frequency ramps, temporal gaps or sections with another different arbitrary frequency modulation can occur. The signal processing means mix a signal having the current transmitting frequency and the transmission power that is reflected from surrounding objects and received by the receiving means. The output signal of the mixing operation is scanned or sampled, if necessary after suitable preprocessing, N times during at least one frequency ramp, wherein N is the number of the samples or scanned values.

A two-dimensional discrete time-frequency-transformation over the respective N samples of K ramps is fully or only partially determined. Here, K indicates the number of the scanned frequency ramps. The radar system is designed in such a way that during the transformation, relative speeds and radial spacing distances are allocated to or associated with the two-dimensional frequency range, i.e. from the two-dimensional frequency of the detected signal power, conclusions are drawn as to the relative speed and the radial spacing distance of the associated object. For suppressing interfering effects at least one of the following quantities or values is varied: the temporal spacing distance of the frequency ramps or the temporal gap between the frequency ramps, the time span from the ramp start up to the beginning of the scanning or sampling of the N values scanned during a frequency ramp, the frequency at the ramp start, and/or the sign of the slope of the frequency ramps.

In an advantageous embodiment of the invention the variation of the frequency ramp characteristics is random or pseudo-random or deterministic. Thus, also interferences caused by other radar systems (e.g. on an oncoming vehicle) that operate according to the same or another method are compensated.

In a preferred embodiment of the invention, the two-dimensional discrete time-frequency-transformation is a two-dimensional discrete fourier transformation. A special embodiment of the radar system provides that when varying one of the mentioned values or quantities a non-linear filtration of discrete signals is performed. Only individual power values of the signals are still disturbed by the variation. These are reduced or suppressed in their effect by a filtration with a non-linear filter.

In a preferred embodiment of the invention for the non-linear filtration, an average value of the magnitude or of the power of predetermined signals is formed. Signal values, whose magnitude or power exceed this average value by a predetermined value, are corrected. In that regard, the values are set to a fixed value, e.g. zero.

In a preferred embodiment of the invention, the non-linear filtration is applied in each case on the N samples of a frequency ramp.

Another embodiment provides that for the signal evaluation a two-dimensional time-frequency-transformation is performed in two steps. In the first transformation step a one-dimensional time-frequency-transformation is calculated respectively over the N samples of a frequency ramp. This step is repeated for K–1 frequency ramps. The non-linear filtration is applied respectively for K values, which have the same frequency value after the first discrete time-frequency-transformation. In a is second transformation step a one-dimensional discrete time-frequency-transformation is calculated respectively over the K output values of the non-linear filtration.

In a special embodiment of the invention at least one of the following values or quantities is varied over the ramps: time span of the N values scanned during a frequency ramp relative to the ramp start, or the frequency at the ramp start, or the sign of the slope of the frequency ramps. A two-dimensional time-frequency-transformation is performed in two steps, wherein in the first step a one-dimensional time-frequency-transformation is calculated respectively over the N samples of a frequency ramp. For compensating the varying ramp characteristics the result of the first discrete time-frequency-transformation is multiplied with a factor $e^{(j*a*b)}$, wherein the term "a" takes into account the respective frequency pertaining to the first sample of a frequency ramp and the sign of its slope, and the term "b" depends on the frequency raster value, i.e. the frequency increment or frequency bin of the fast fourier transformation.

Another embodiment of the radar system and method provides that the temporal spacing distance of the frequency ramps is varied in such a way that the delay of the ramp starting times to a temporally fixed raster represents approximately a discrete uniform distribution.

In particular the delay of the ramp starting times to a temporally fixed raster is varied only so much or so strongly that the difference from a fixed raster point to the ramp start and the associated actual ramp start is smaller than a predetermined threshold value. The threshold value is selected e.g. such that with the two-dimensional time-frequency-transformation the interfering effect due to the non-equidistant scanning is negligibly small.

A preferred embodiment of the radar system and method provides that the time span of the N values sampled during a frequency ramp relative to the ramp start is varied in a discrete raster, wherein these raster spacing distances are at least partially unequal to the scanning spacing distances of the N samples. False signals caused by trappings or over-range faults are thus formed incoherently. In particular the raster spacing distance is constant and half the size as the constant scanning spacing distance between the N samples.

BRIEF DESCRIPTION OF THE DRAWINGS

In the following the invention will be explained in further detail on the basis of drawings and example embodiments, in which.

DETAILED DESCRIPTION OF EXAMPLE EMBODIMENTS OF THE INVENTION

Figure 1:
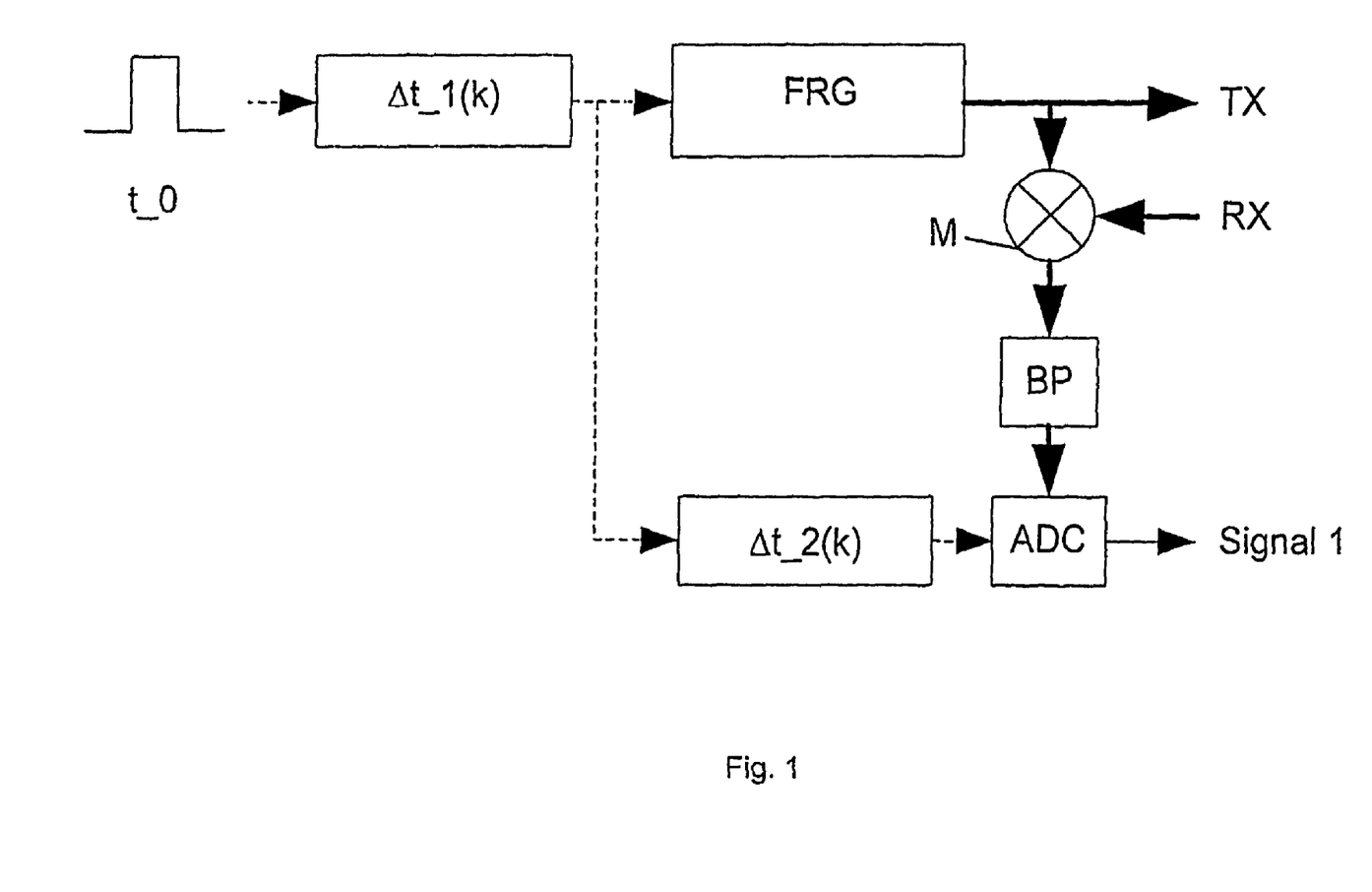
FIG. 1 shows a block diagram of a radar system with a compensation of interfering signals.

FIG. 1 is a block diagram of a radar system. The dashed lines indicate the trigger paths. Analog paths are marked with thick or bold lines. At the time $t\_0$ a starting pulse for the measurement is emitted. For recording a data set the starting pulse is repeated K-times at the same time spacing or temporal distance. The time spacing or temporal distance of the starting pulses corresponds to the pulse repeating interval of a regular pulse-doppler radar.

The delay unit $\Delta t\_1(k)$ delays the starting signal subject to "k". The term "k" is a control variable whose value is increased by 1, for each further starting signal, up to a predetermined value K (k=0, 1, 2, 3, ... K). With the output signal of the delay unit $\Delta t\_1(k)$, the starting point of the transmission interval $t\_S$ is set or determined for a measurement "k". A unit for generating linear frequency-modulated signals, the frequency ramp generator FRG, is controlled by the output signal. The signal $T\_x$ emitted by the unit is divided. One part is amplified if necessary and is emitted or radiated as a transmitting signal via an antenna, and the second part is supplied to a mixer M. The receiving signal $R\_x$ reflected from surrounding objects is received, if applicable via the same antenna, and is similarly supplied to the mixer M. The output signal of the mixer M has the difference frequency of the transmitting signal $T\_x$ and the receiving signal $R\_x$. The frequency of the output signal is proportional to the distance of the detected object. The output signal of the mixer is filtered in a band pass filter. The filtered signal is digitized with an analog-digital converter ADC and for this purpose is scanned or sampled N times per frequency ramp within a receiving interval $t\_E$. The output signal Signal 1 consists of N samples per ramp with K repetitions (number of the scanned ramps). The start of the receiving interval $t\_E$ relative to the starting point of the transmission interval $t\_S$ is determined by the delay unit $\Delta t\_2(k)$ for a measurement "k".

Figure 2A:
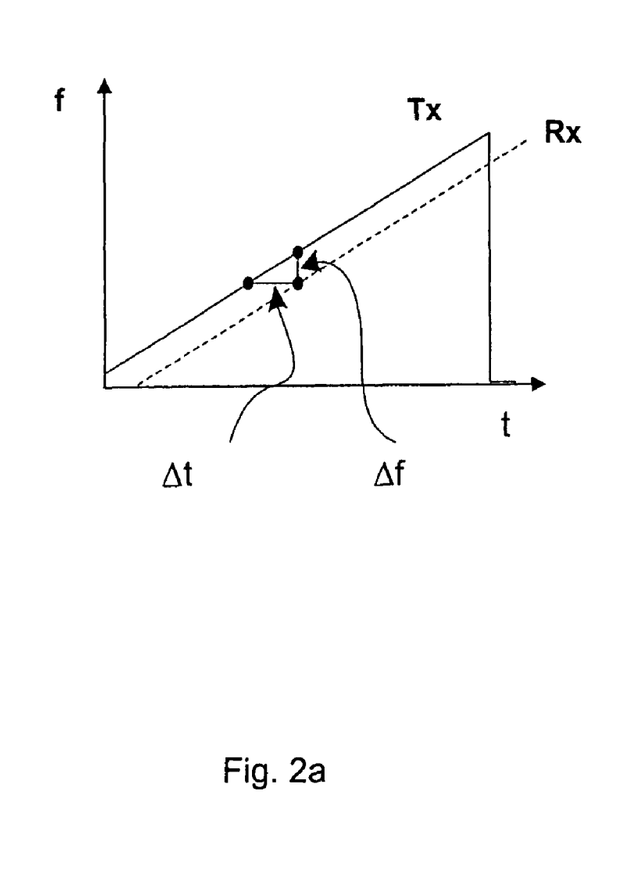
FIG. 2a shows a frequency time diagram of transmitting and receiving signals.

FIG. 2a shows the frequency for a transmission ramp Tx and an associated receiving signal Rx over time. The temporal offset $\Delta t$ of the receiving signal Rx, caused by the flight time or transit time of the radar radiation to the object and back, results in a frequency shift $\Delta f$ of the receiving signal Rx relative to the transmitting signal Tx. The frequency shift $\Delta f$ is proportional to the distance of the object.

Figure 2B:
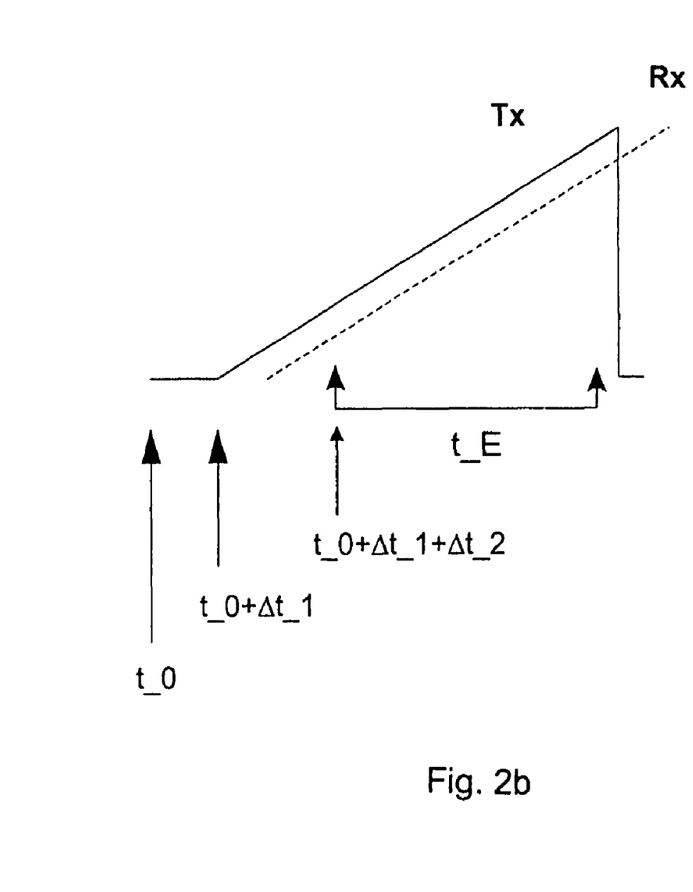
FIG. 2b shows a temporal course of transmitting and receiving signals.

FIG. 2b shows the frequency of transmitting signal Tx and receiving signal Rx over time. The mixed receiving signal is scanned or sampled only in a limited receiving interval. The signal energy at a predetermined frequency—the distance of an object is proportional to $\Delta f$—is contained in the entire mixing region or range Tx-Rx, therefore, the position of the receiving interval $t\_E$ can be varied in this range. In addition, the delay times $\Delta t\_1(k)$ and $\Delta t\_2(k)$ are shown in FIG. 2b. By the delay $\Delta t\_1(k)$, the transmitting and receiving intervals are shifted ("jitted") in equal measure. Here, the signal level of fixed interfering frequencies (e.g. internal interfering frequencies) is reduced, because they are detected with another different phase position in each of the K ramp intervals. The range of values of the delay $\Delta t\_1(k)$ is selected to be so small that the level of the wanted or useful signal is reduced only slightly. By the additional delay $\Delta t\_2(k)$ the transmitting and receiving intervals are shifted relative to each other. Thereby, the signal level of external interference sources as well as the signal level from trapping or over-range reception is reduced.

Figure 3:
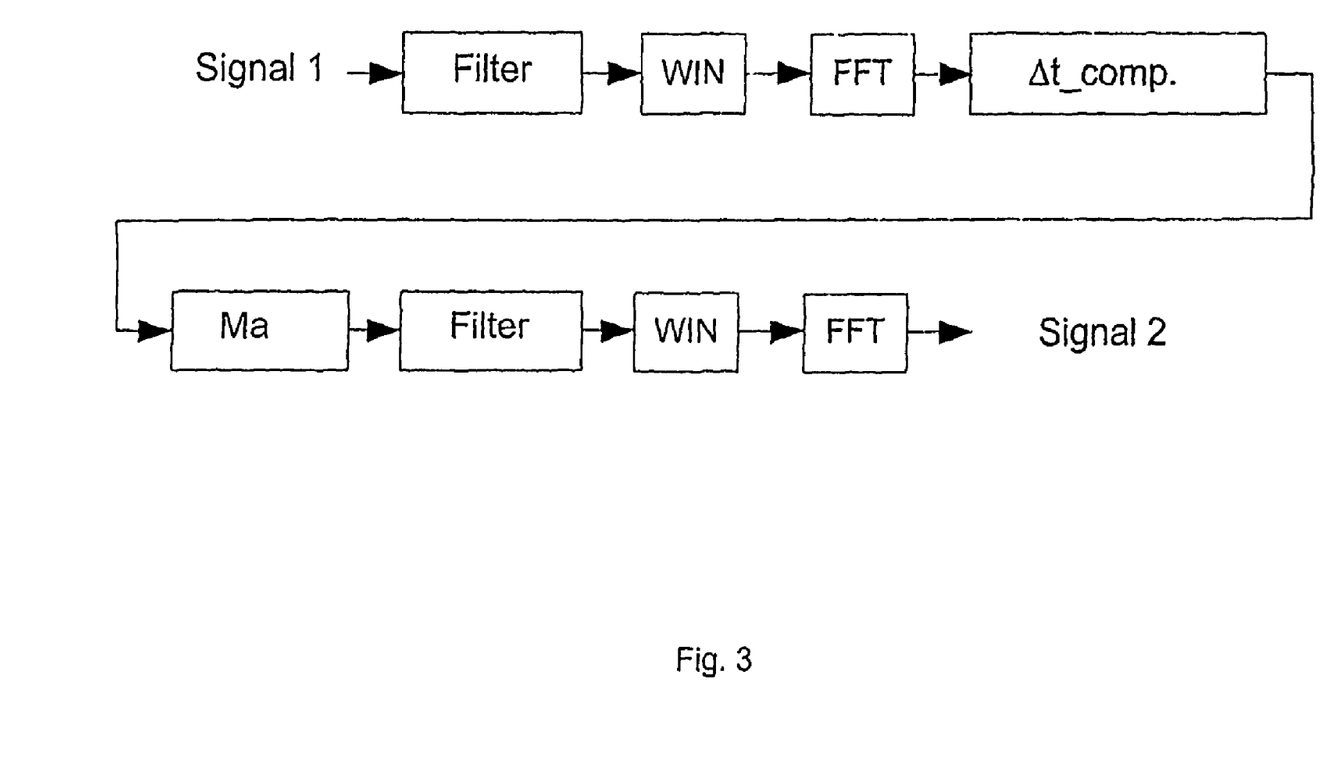
FIG. 3 shows a block diagram of the signal processing with a two-dimensional FFT.

FIG. 3 shows the digital signal processing of the sample values up to the doppler spectra. Signal 1, consisting of N values, recorded with K repetitions, is fed into the signal processing unit. A two-dimensional FFT is realized by successive FFTs of rows and columns of a matrix. A temporary storage or intermediate memory Ma for the matrix values is arranged between the first and the second FFT. Before the first and the second FFT, a windowing of the data signal takes place. This is shown in FIG. 3 by the blocks WIN. To minimize the influence of external interference sources as far as possible, non-linear filters are provided before the first and the second FFT.

During the filtering, those samples having a value higher than a threshold value are replaced by a fixed value, e.g. zero. The threshold value depends on the magnitude or power values of the sampled values.

The delay $\Delta t\_2(k)$ has a non-negligible influence on the phase of the signal after the first FFT. The frequency-dependent phase rotation is compensated by the compensator $\Delta t\_{comp}$ dependent on the value $\Delta t\_2(k)$. At the end of the signal processing, one obtains the doppler signal Signal 2, which is composed of K values with N repetitions.

Figure 4:
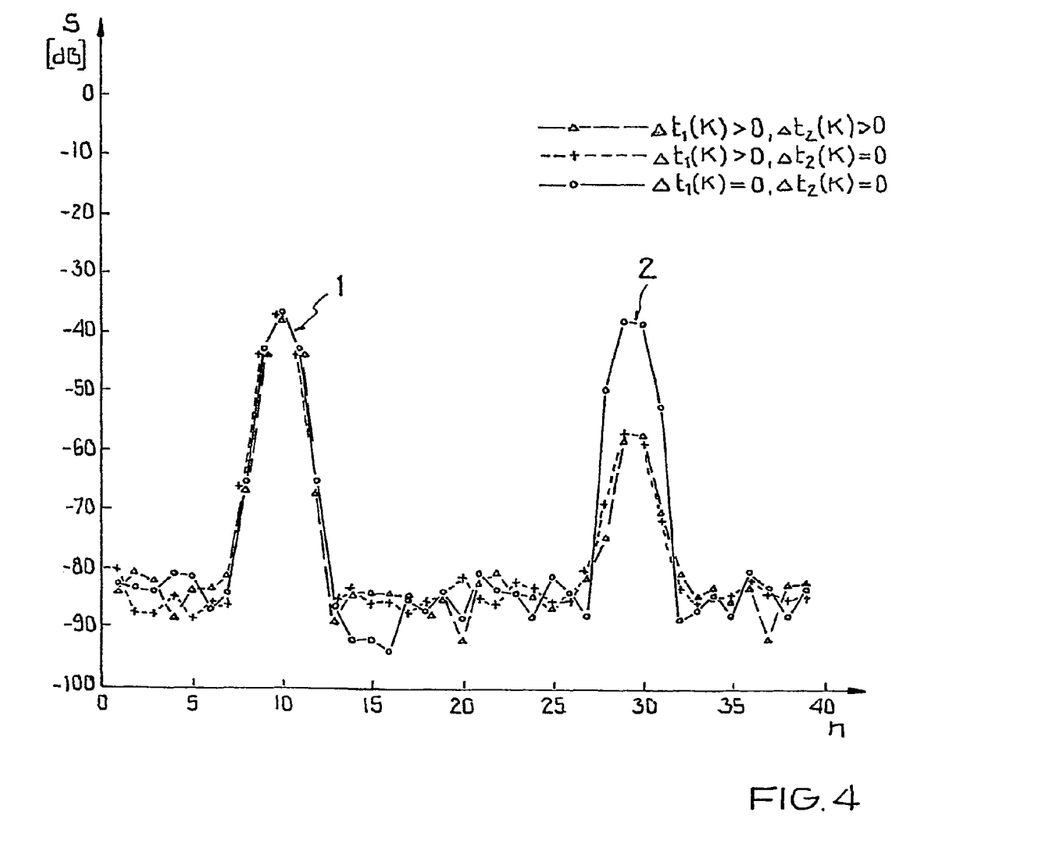
FIG. 4 shows a signal power represented over the frequency, as recorded with a variation in time of the ramp starting times $\Delta t\_1$ and of the sampling times $\Delta t\_2$, respectively.

FIG. 4 shows the simulation of the signal level after the first FFT over the distance gates n, with n=1 ... 39. The distance gates result from the digital scanning or sampling. The figure shows, at the distance gate 10 a target 1 and at the distance gate 30 an interference line 2 with fixed frequency and identical signal level. The simulation was performed for different delays for the transmitting and receiving interval. The solid line shows the signal level, if no variation of the transmitting and receiving intervals $\Delta t\_1=0$ and $\Delta t\_2=0$ is provided. Approximately the same signal level is achieved by both power peaks. If the transmitting and receiving intervals are shifted in equal measure by a variation of Δt_1(k), then the signal level of the interference line falls by approx. 18 dB, as is shown in FIG. 4 with the fine dashed line.

If in addition the transmitting and receiving intervals are shifted relative to each other by a variation of Δt_2(k), then the signal level (FIG. 4, rough dashed line) of the interference line similarly falls in the example to a value that is approx. 18 dB below the starting level.

The signal level of the target object 1 at the distance gate 10 is maintained with the variation of Δt_1 and Δt_2.

The invention claimed is:

1. A radar system for detecting objects in a surrounding environment, said system comprising:
   a transmitter adapted to generate a radar signal and to emit into said surrounding environment a first portion of said radar signal as an emitted signal having a frequency that is modulated in a succession of linear frequency ramps over time, wherein said linear frequency a ramps respectively have ramp slopes that all have an identical ramp slope magnitude, and wherein said emitted signal further has, between successive ones of said linear frequency ramps, temporal gaps during which said frequency is not modulated or is modulated differently from said linear frequency ramps;
   a receiver adapted to receive a received signal that arises from a reflection of a portion of said emitted signal from said objects in said surrounding environment; and
   a signal processor comprising a mixer, a digital sampler, and a time-frequency transformation circuit;
   wherein said mixer has a first mixer input connected to an output of said transmitter to receive a second portion of said radar signal, a second mixer input connected to said receiver to receive said received signal, and a mixer output at which said mixer is adapted to output an intermediate signal resulting from mixing said second portion of said radar signal with said received signal;
   wherein said digital sampler is connected to said mixer output and is adapted to perform a sampling of said intermediate signal, N times during each respective one of K of said linear frequency ramps to produce at a sampler output of said digital sampler N samples for each one of said K linear frequency ramps;
   wherein said time-frequency transformation circuit comprises a series circuit comprising a first windowing element, a first fast Fourier transformation element, a time shift element for phase rotation compensation, an intermediate memory, a second windowing element, and a M second fast Fourier transformation element;
   wherein said time-frequency transformation circuit is connected to said sampler output of said digital sampler and is adapted to perform a two-dimensional discrete time-frequency transformation at least partially over the respective said N samples for each one of said K linear frequency ramps, whereby in said transformation relative speeds and radial distances of said objects relative to said receiver are determined from a two-dimensional frequency of said samples and are allocated to a two-dimensional frequency domain; and
   wherein, to suppress interference influences, said transmitter and said digital sampler are adapted to vary at least one of the following values over said succession of said linear frequency ramps:
   a) a respective duration respectively of said temporal gaps between said successive ones of said linear frequency ramps,
   b) a duration of a delay time from a respective ramp start of a respective one of said linear frequency ramps until a beginning of said sampling to produce said N samples during said respective linear frequency ramp,
   c) a starting frequency at a respective ramp start of a respective one of said linear frequency ramps, and
   d) a sign of a respective one of said ramp slopes of a respective one of said linear frequency ramps.

2. The radar system according to claim 1, wherein said transmitter comprises:
   a start signal generator adapted to generate a succession of starting pulses at regular time spacings and with a first one of said starting pulses at a start time,
   a first delay unit having an input connected to an output of said start signal generator and adapted to delay said starting pulses successively respectively by a delay value dependent on a control variable that is incremented for each successive one of said starting pulses to vary said respective duration respectively of said temporal gaps between said successive ones of said linear frequency ramps,
   a frequency ramp generator having an input connected to an output of said first delay unit and having an output adapted to output said radar signal, and
   a first antenna connected to said output of said frequency ramp generator.

3. The radar system according to claim 2, wherein said digital sampler comprises an analog-to-digital converter, a band pass filter connected between said mixer output and an analog signal input of said analog-to-digital converter, and a second delay unit having an input connected to said output of said first delay unit and having an output connected to a timing input of said analog-to-digital converter, wherein said second delay unit is adapted to vary said duration of said delay time from said respective ramp start until said beginning of said sampling during said respective linear frequency ramp.

4. The radar system according to claim 2, wherein said frequency ramp generator is adapted to vary said starting frequency at said ramp start of said respective linear frequency ramp.

5. The radar system according to claim 2, wherein said frequency ramp generator is adapted to vary said sign of said respective ramp slope of said respective linear frequency ramp.

6. The radar system according to claim 1, wherein said transmitter comprises a frequency ramp generator that is adapted to vary said starting frequency at said ramp start of said respective linear frequency ramp.

7. The radar system according to claim 1, wherein said transmitter comprises a frequency ramp generator that is adapted to vary said sign of said respective ramp slope of said respective linear frequency ramp.

8. The radar system according to claim 1, wherein said transmitter comprises a delay unit and a frequency ramp generator connected to said delay unit, wherein said delay unit and said frequency ramp generator are adapted to vary said respective duration respectively of said temporal gaps between said successive ones of said linear frequency ramps.

9. The radar system according to claim 1, wherein said digital sampler comprises a delay unit and an analog-to-digital converter connected to said delay unit, wherein said delay unit and said analog-to-digital converter are adapted to vary said duration of said delay time from said respective ramp start to said beginning of said sampling during said respective linear frequency ramp.

10. The radar system according to claim 1, wherein said series circuit of said time-frequency transformation circuit further comprises a first non-linear filter and a second non-linear filter.

11. A method of detecting objects in a surrounding environment, said method comprising:
   a) generating a radar signal having a frequency that is modulated in a succession of linear frequency ramps over time, wherein said linear frequency ramps respectively have ramp slopes that all have an identical ramp slope magnitude, and wherein said radar signal further has, between successive ones of said linear frequency ramps, temporal gaps during which said frequency is not modulated or is modulated differently from said linear frequency ramps;
   b) emitting a first portion of said radar signal into said surrounding environment;
   c) receiving a received signal that arises from a reflection of a portion of said emitted signal from said objects in said surrounding environment;
   d) mixing a second portion of said radar signal with said received signal or a pre-processed version of said received signal to form an intermediate signal;
   e) digitally sampling said intermediate signal N times during each respective one of K of said linear frequency ramps to produce N samples for each one of said K linear frequency ramps;
   f) performing a two-dimensional discrete time-frequency transformation at least partially respectively over said N samples for each one of said K linear frequency ramps, and determining relative speeds and radial distances of said objects from a two-dimensional frequency of said samples determined in said transformation, and allocating said relative speeds and said radial distances to a two-dimensional frequency domain, wherein said two-dimensional discrete time-frequency transformation comprises performing in succession at least a first windowing, a first fast Fourier transformation, a time shift for phase rotation compensation, an intermediate memory storage, a second windowing, and a second fast Fourier transformation; and
   g) suppressing interference influences, comprising varying at least one of the following variable values over said succession of said linear frequency ramps:
      g1) a first variable value being a respective duration respectively of said temporal gaps between said successive ones of said linear frequency ramps,
      g2) a second variable value being a duration of a delay time from a respective ramp start of a respective one of said linear frequency ramps until a beginning of said sampling to produce said N samples during said respective linear frequency ramp,
      g3) a third variable value being a starting frequency at a respective ramp start of a respective one of said linear frequency ramps, and
      g4) a fourth variable value being a sign of a respective one of said ramp slopes of a respective one of said linear frequency ramps.

12. The method according to claim 11, wherein said suppressing of said interference influences comprises varying said first variable value.

13. The method according to claim 11, wherein said suppressing of said interference influences comprises varying said second variable value.

14. The method according to claim 11, wherein said suppressing of said interference influences comprises varying said third variable value.

15. The method according to claim 11, wherein said suppressing of said interference influences comprises varying said fourth variable value.

16. The method according to claim 11, wherein said suppressing of said interference influences comprises varying a plurality of said variable values selected from said first variable value, said second variable value, said third variable value, and said fourth variable value.

17. The method according to claim 11, wherein said varying of at least one of said variable values is performed according to a random variation or a pseudo-random variation.

18. The method according to claim 11, wherein said varying of at least one of said variable values is performed according to a deterministic variation.

19. The method according to claim 11, wherein said suppressing of said interference influences further comprises performing a non-linear filtering of said N samples for each one of said K linear frequency ramps.

20. The method according to claim 19, wherein said non-linear filtering comprises forming an average magnitude value or an average power value over a plurality of said samples, and then correcting a respective value of each one of said samples of which a respective magnitude value or a respective power value exceeds said average magnitude value or said average power value by at least a specified amount.

21. The method according to claim 20, wherein said correcting comprises replacing said respective value with a specified fixed value.

22. The method according to claim 19, wherein said two-dimensional discrete time-frequency transformation comprises a first transformation stage and a second transformation stage, said first transformation stage comprises calculating a first one-dimensional discrete time-frequency transformation respectively over said N samples respectively for each one of said K linear frequency ramps to produce first transformation output values, said non-linear filtering is applied to K of said first transformation output values which each comprise an identical frequency value after said first transformation stage to produce K filtered output values, and said second transformation stage comprises calculating a second one-dimensional discrete time-frequency transformation respectively over said K filtered output values.

23. The method according to claim 11, wherein said suppressing of said interference influences comprises varying said respective duration respectively of said temporal gaps between said successive linear frequency ramps over said succession of said linear frequency ramps to produce approximately a discrete uniform distribution of respective delay times of respective ramp start time points of said successive linear frequency ramps relative to a temporally fixed time raster.

24. The method according to claim 23, wherein said respective delay times of said respective ramp start time points relative to said temporally fixed time raster are less than a prescribed maximum threshold value.

25. The method according to claim 11,
   wherein said digital sampling is carried out at successive sample time spacings to produce said N samples with said sample time spacings respectively between successive ones of said N samples,
   wherein said suppressing of said interference influences comprises varying said second variable value respectively to any selected one of plural successive raster time points making up a discrete time raster with respective raster time spacings respectively between successive ones of said raster time points, and wherein at least some of said raster time spacings between said successive raster time points in said discrete time raster are unequal to said sample time spacings between said successive ones of said N samples.

26. The method according to claim 11, further comprising producing said pre-processed version of said received signal by at least band pass filtering said received signal, and wherein said mixing comprises mixing said second portion of said radar signal with said pre-processed version of said received signal to form said intermediate signal.

27. A method of detecting objects in a surrounding environment, said method comprising:
   a) generating a radar signal having a frequency that is modulated in a succession of linear frequency ramps over time, wherein said linear frequency ramps respectively have ramp slopes that all have an identical ramp slope magnitude, and wherein said radar a signal further has, between successive ones of said linear frequency ramps, temporal gaps during which said frequency is not modulated or is modulated differently from said linear frequency ramps;
   b) emitting a first portion of said radar signal into said surrounding environment;
   c) receiving a received signal that arises from a reflection of a portion of said emitted signal from said objects in said surrounding environment;
   d) mixing a second portion of said radar signal with said received signal or a pre-processed version of said received signal to form an intermediate signal;
   e) digitally sampling said intermediate signal N times at successive sample time spacings during each respective one of K of said linear frequency ramps to produce N samples, with said sample time spacings respectively between successive ones of said N samples, for each one of said K linear frequency ramps;
   f) performing a two-dimensional discrete time-frequency transformation at least partially respectively over said N samples for each one of said K linear frequency ramps, and determining relative speeds and radial distances of said objects from a two-dimensional frequency of said samples determined in said transformation, and allocating said relative speeds and said radial distances to a two-dimensional frequency domain; and
   g) suppressing interference influences, comprising varying, over said succession of said linear frequency ramps, a duration of a delay time from a respective ramp start of a respective one of said linear frequency ramps until a beginning of said sampling,
   wherein said duration of said delay time is varied to any selected one of plural successive raster time points making up a discrete time raster with respective raster time spacings respectively between successive ones of said raster time points,
   wherein at least some of said raster time spacings between said raster time points in said discrete time raster are unequal to said sample time spacings between said successive ones of said N samples, and
   wherein said raster time spacings all have a first specified constant value, said sample time spacings all have a second specified constant value, and said first specified constant value is one-half of said second specified constant value.

* * * * *

UNITED STATES PATENT AND TRADEMARK OFFICE
CERTIFICATE OF CORRECTION

PATENT NO. : 8,203,481 B2
APPLICATION NO. : 12/310933
DATED : June 19, 2012
INVENTOR(S) : Markus Wintermantel et al.

It is certified that error appears in the above-identified patent and that said Letters Patent is hereby corrected as shown below:

Title page,
Item [56], References Cited, U.S. PATENT DOCUMENTS,
Line 2, after "5/1997", replace "Hoss et al." by --Hoess et al.--;

Column 2,
Line 46, after "In a", delete "is";

Column 5,
Line 20, after "frequency", delete "a";
Line 49, after "and a", delete "M";

Column 9,
Line 16, after "radar", delete "a".

Signed and Sealed this
Fifth Day of February, 2013

Teresa Stanek Rea
*Acting Director of the United States Patent and Trademark Office*